United States Patent [19]

Yoshida et al.

[11] 4,212,040

[45] Jul. 8, 1980

[54] TAPE RECORDER WITH SINGLE CONTROL ACTIVATING MEMBER

[75] Inventors: Masashi Yoshida, Nakaminato; Yasuo Iino, Katsuta, both of Japan

[73] Assignee: Hitachi, Ltd., Japan

[21] Appl. No.: 923,196

[22] Filed: Jul. 10, 1978

[30] Foreign Application Priority Data

Jul. 11, 1977 [JP] Japan .................................. 52-82001
Sep. 30, 1977 [JP] Japan .......................... 52-130545[U]

[51] Int. Cl.² ........................ G11B 15/22; G11B 5/54; G11B 21/22
[52] U.S. Cl. .................................... 360/96.3; 360/105
[58] Field of Search ............................... 360/105, 96.3

[56] References Cited

U.S. PATENT DOCUMENTS 4,071,865  1/1978  Nakasuna ............................ 360/105
4,131,922  12/1978  Yoshida et al. ...................... 360/105

Primary Examiner—Robert S. Tupper

Attorney, Agent, or Firm—Craig & Antonelli

[57] ABSTRACT

A tape recorder is disclosed in which the movement of the pinch roller toward and away from the capstan, the movement of the take-up roller toward and away from the take-up reel mount and the movement of the brake plate toward and away from the take-up and supply reel mounts are performed by a single control board having three control sections. The movement of the control board is associated with that of the head base plate carrying a magnetic head and movable between a stop position and a playback position. When the head base plate moves to the playback position, the control board moves together with the head base plate by the elasticity of the spring member tensioned therebetween, whereby the three types of movements make possible the desired playback state. In response to an external operation for a pause, the control board alone is moved to the stop position, thus turning the three types of movements into a pause mode.

2 Claims, 4 Drawing Figures

TAPE RECORDER WITH SINGLE CONTROL ACTIVATING MEMBER

BACKGROUND OF THE INVENTION

1. Field of the Invention

This invention relates to a tape recorder or more in particular to an operating mechanism of the tape recorder.

2. Description of the Prior Art

Generally, the tape recorder is so operated that upon switching from a stop state to a playback or recording state, four internal motions occur. They include, firstly, movement of the magnetic head and like to a playback position and engagement thereof in that position; secondly, the pinch roller coming into contact with the capstan; thirdly, the take-up roller, which derives its power from a motor, coming into contact with the take-up reel mount; and fourthly, the releasing of the brake plate which, in contact with the take-up reel mount and the supply reel mount, has thus far applied braking force to the pair of reel mounts.

These four operations are generally derived from the movement of the playback operating member from the stop position to the playback position. In the conventional tape recorders, each of the four operations is performed through individual parts controlled by the movement of the playback operating member, with the result that various inconveniences are caused by the difference in timing of completion of the four operations.

As an example, the fault due to the difference in timing between the second and third motions mentioned above will be described. Generally, the second operation is one in which the tape is fed at fixed speed by being held between the capstan rotated at fixed speed and the pinch roller in free rotation. The third operation, on the other hand, is for taking up on the take-up reel mount the tape supplied through the capstan and the pinch roller. Since the rotational speed of the take-up reel changes with the thickness of the convolutions of the tape taken up thereon, the tape take-up speed of the take-up reel mount is generally set at a level higher than the tape supply speed of the capstan and pinch roller, so that the difference in speed therebetween is absorbed into a slip mechanism provided on the take-up reel mount. If the second operation is completed earlier than the third operation, the tape is supplied from the capstan while the rotation of the take-up reel mount is delayed, thus forcing out the tape. In the event that the completion of the third operation is earlier than that of the second operation, by contrast, the tape is taken up at undesirably higher speed.

If the difference in timing between the first and fourth operations occurs in addition to the above-mentioned fault, a more complicated inconvenience results. These faults present themselves more conspicuously when the playback operating member is operated slowly.

Prevention of these faults requires proper timing of the four operations. For this purpose, the parts participating in the four operations are required to be produced in high precision, and also the adjustment of timing is necessary in assembling such parts, resulting in a high production cost.

Although the foregoing description is primarily concerned with the playback operation, the same principle applies also to the timing of switching from playback to pause mode or suspension of operation. In this case, the operations reverse to the second, third and fourth operations mentioned above are in principle required. In the conventional tape recorders having the pause mechanism, however, the pinch roller is moved away from the capstan and the take-up roller away from the take-up reel mount, but the brake plate is not brought into contact with the pair of reel mounts. The resulting disadvantage is that the reel mounts fail to stop accurately, thereby continuing to feed the tape by inertia.

SUMMARY OF THE INVENTION

The present invention, which has been made in view of the above-mentioned disadvantages of the conventional tape recorders, has an object to provide a tape recorder with a simplified construction greatly facilitating the timing adjustment.

According to one aspect of the present invention, there is provided a tape recorder in which a head base plate interlocked with the playback operating member carries and transports a magnetic head between the stop position and the playback position. According to another aspect of the invention, the three operations including the movement of the pinch roller toward and away from the capstan, the movement of the take-up roller toward and away from the take-up reel mount and the movement of the brake plate toward and away from the pair of reel mounts are directly controlled by a single control board which is connected through an elastic or spring member to the head base plate.

When the head base plate moves to the playback position, the control board is moved to the playback position in response to the movement of the head base plate by the elastic force of the elastic member. While the control board is being thus moved, it controls the three operations. Further, at the time of pause, the control board is restored toward the stop position against the elasticity of the elastic member regardless of the condition of the head base plate, while at the same ending the control of the three operations.

BRIEF DESCRIPTION OF THE DRAWINGS

FIGS. 1 to 3 are plan views of a first embodiment of the tape recorder according to the present invention, in which FIG. 1 is a diagram showing a stop state;

FIG. 2 shows a playback or recording state; and

FIG. 3 shows a pause state.

DESCRIPTION OF THE PREFERRED EMBODIMENTS

Figure 1:
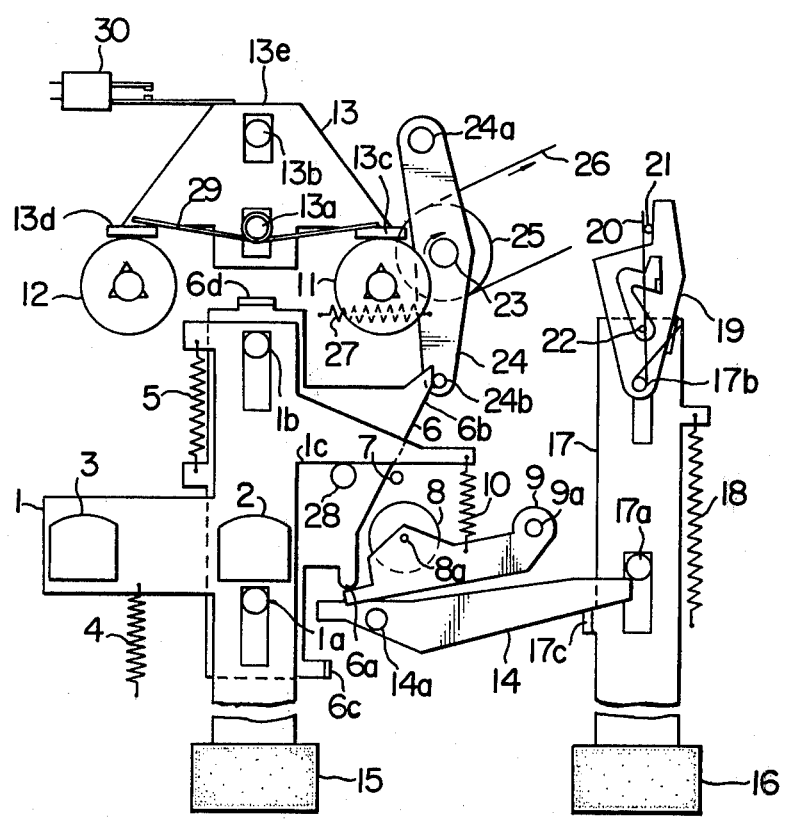

In FIG. 1, reference numeral 1 shows a head base plate carrying magnetic heads 2 and 3 and adapted to be guided slidably by guides 1a and 1b erected on a fixed base (not shown). The head base plate 1 has a playback button 15 secured to the lower side in the drawing and an elastic or spring member 4 suspended in tension between itself and the fixed base to keep the head base plate 1 urged toward the stop position (lower side in the drawing). The pinch roller 8 is fitted by way of the shaft 8a into the pinch roller arm 9 rotatable around the pin 9a of the fixed base. A spring 10 is tensioned between the pinch roller arm 9 and the head base plate 1, thereby urging the pinch roller 8 toward the capstan 7. The control board 6, like the head base plate 1, is adapted to be slidably guided by the guides 1a and 1b of the fixed base, and laid direct under the head base plate 1. An elastic member 5 is suspended in tension between the control board 6 and the head base plate 1. The stopper pin 28 provided on the control board 6 is in contact with the right section 1c of the head base plate 1. The control board 6 further includes a protrusion 6a in contact with part of the pinch roller arm 9, and a cam section 6b in contact with the pin 24b provided on the take-up arm 24 rotatable around the shaft 24a of the fixed base. The take-up arm 24 is provided on the same axis as an idler roller 23 for driving the take-up reel mount 11 and a pulley 25 to which rotation is transmitted through the belt 26 from the driving shaft (not shown) of a motor or like. A spring 27 is tensioned between the arm 24 and the fixed base.

The brake-operating plate 13 is slidable with respect to the fixed base by the guides 13a and 13b of the fixed base. When the tape recorder is in stop state, the brake-operating plate 13 is urged toward the reel mounts 11 and 12 by the spring 29, so that the brake shoes 13c and 13d thereof are pressed into contact with the reel mounts 11 and 12.

Numeral 16 shows a pause button fixed on the pause slider 17 slidably arranged by the guides 17a and 17b of the fixed base. The pause button 16 is of push-push type and pushed for operation through a well-known lock mechanism including a pause lock arm 19 rotatable around the guide 17b, a pin 22 secured on the slider 17, a stopper 21 and a spring 20. A spring 18 is tensioned between the pause slider 17 and the fixed base. On the other hand, the lever 14 rotatably mounted on the shaft 14a of the fixed base. One end of the lever 14 is opposed to the bent portion or hook 6c of the control board 6 and the other end thereof to the hook 17c of the pause slider 17.

Figure 2:
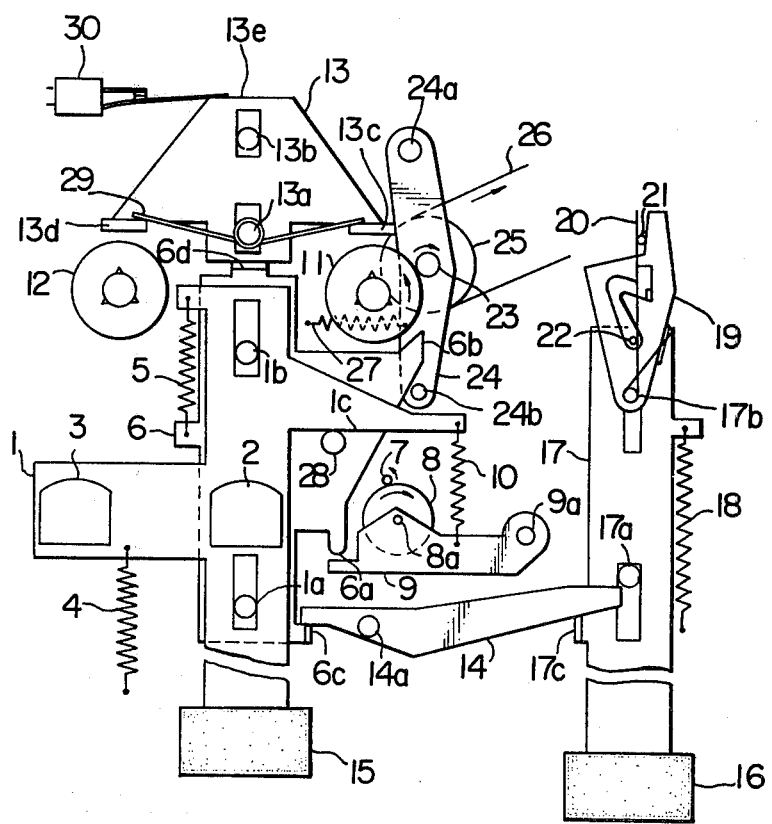

Now, explanation will be made about the playback operation with reference to FIGS. 1 and 2. When the playback button 15 is depressed under the stop state of FIG. 1, the head base plate 1 moves forward and is stopped at playback position in engagement with a well-known lock mechanism (not shown). Under this condition, the control board 6 is pulled by the elastic member 5 and moves forward with the stopper pin 28 thereon in contact with the right section 1c of the head base plate 1. As a result, the pinch roller arm 9, which has been released from the restraint by the protrusion 6a of the control board 6, rotates in the clockwise direction around the pin 9a by the force of the spring 10 so that the pinch roller 8 is finally pressed into contact with the capstan 7. The take-up arm 24 also begins to rotate in the clockwise direction around the shaft 24a with the pin 24b kept in contact with the cam 6b by the spring 27. Soon after, the idler roller 23 is pressed into contact with the reel mount 11, thus rotating the same reel mount 11 in the direction of arrow in FIG. 2. Further, the brake-operating plate 13 is displaced by the forward bent part 6d of the control board 6 against the force of the spring 29, so that the brake shoes 13c and 13d release the braking of the reel mounts 11 and 12. Thus the playback state as shown in FIG. 2 is attained. In this state, the tape (not shown) passes the magnetic heads 3 and 2, and while being driven in pressed state between the capstan 7 and the pinch roller 8, is taken up by the reel mount 11.

The brake-operating plate 13, on the other hand, by being displaced as shown in the drawing, causes the forward end 13e thereof to close the switch 30. The switch 30 is for controlling an automatic stop mechanism (not shown) operated in response to detection of a tape end. When the switch 30 is off, the automatic stop mechanism is inoperable, while when the switch 30 is on, it is operable. In the playback state of FIG. 2, the automatic stop mechanism is in operable condition, and therefore, upon detection of a tape end, the recorder is automatically stopped and returned to the state of FIG. 1. In the case where the playback state is released by the operation of the automatic stop mechanism or operation of the stop button (not shown), the head base plate 1 is restored to its original position by the elastic member 4. At the same time, the stopper pin 28 of the control board 6 is pressed by the right section 1c of the head base plate 1, and therefore the control board 6 is moved backward (downward in the drawing) together with the head base plate 1. The protrusion 6a rotates the pinch roller arm 9 in the counterclockwise direction, thereby releasing the pinch roller 8 from the pressed contact with the capstan 7. Further, the cam section 6b pushes the pin 24b, and thus rotates the take-up arm 24 in the counterclockwise direction, with the result that the contact of the idler roller 23 with the reel mount 11 is released, thus stopping the driving of the reel mount 11. In response to the backward movement of the control board 6, the brake-operating plate 13 is restored to the original position by the spring 29, finally causing the brake shoes 13c and 13d to be pressed into contact with the reel mounts 11 and 12 to stop the same. In this way, in the stop condition of FIG. 1, the switch 30 is off and therefore the automatic stop mechanism fails to work.

Figure 3:
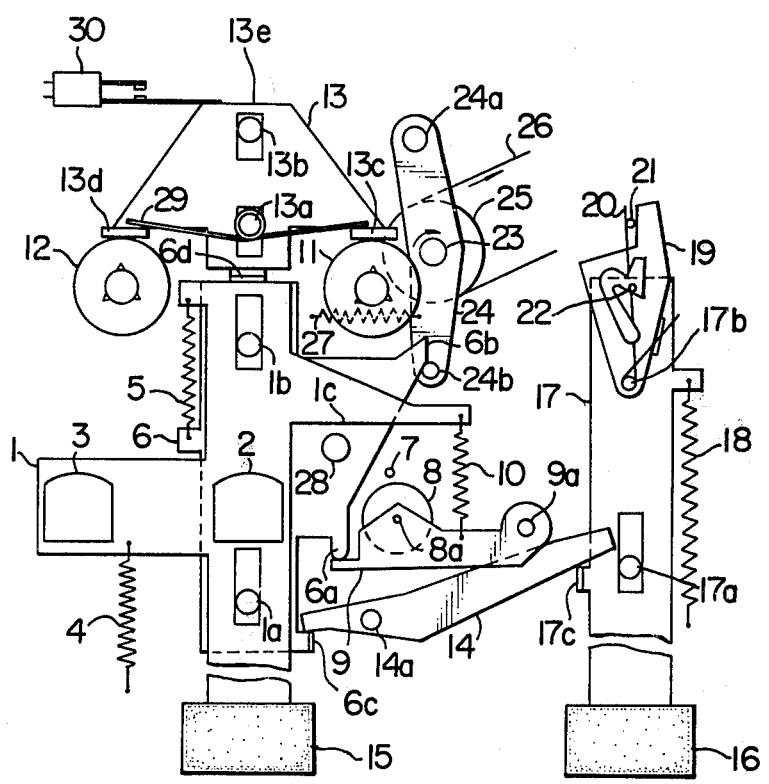

The pause operation will be now explained. When the pause button 16 is pressed under the playback condition of FIG. 2, the pause slider 17 advances against the force of the spring 18, with the result that slider 17 is soon stopped in engagement in the advanced position of FIG. 3 by the well-known lock mechanism including the pause lock arm 19, the spring 20, the stopper 21 and the pin 22 on the slider 17. Under this condition, the lever 14 is pushed inward by the bent portion 17c of the slider 17 and rotated in the counterclockwise direction around the shaft 14a. This rotation of the lever 14 causes the bent portion 6c of the control board 6 to be pushed and displaced toward the stop state against the spring member 5. As a result, as if the stopping operation is performed, the pressed contact of the pinch roller 8 with the capstan 7 and the idler roller 23 with the reel mount 11 are released, while at the same time causing the brake-operating plate 13 to perform the braking operation, so that the tape is stopped into a pause state. Since the switch 30 is turned off, the automatic stop mechanism fails to work. Under this condition, assume, for example, that the forward ends of the fast forward and rewind operating members (not shown) are opposed to the brake-operating plate 13 so that the fast forward or rewind operating may release the brake-operating plate 13. Then the switch is turned on, and therefore it is possible to actuate the automatic stop mechanism at a tape end at the time of fast forward or rewind state.

For cancelling the pause state, the pause button 16 under the condition of FIG. 3 is depressed again. The pause lock arm 19 is disengaged from the pin 22, and the slider 17 is restored to the original position thereof by the spring 18. At the same time, the bent portion 17c also moves backward, so that the lever 14 rotates in the clockwise direction and the control plate 6 is restored to the state shown in FIG. 2 by the force of the spring member 5. Thus, the pinch roller 8 is again pressed into contact with the capstan 7, the take-up reel mount 11 is driven and the brake-operating plate 13 is actuated into the playback state. Incidentally, if under the stop state of FIG. 1, the pause button 16 is locked followed by the depressing of the playback button 15, the head base plate 1 and the control board 6 move together with each other until the bent portion 6c of the control plate 6 comes into contact with the lever 14. After the bent portion 6c is brought into contact with the lever 14, however, the spring member 5 is expanded thereby to further advance the head base plate 1 alone into a locked position, resulting in the pause state of FIG. 3.

Figure 4:
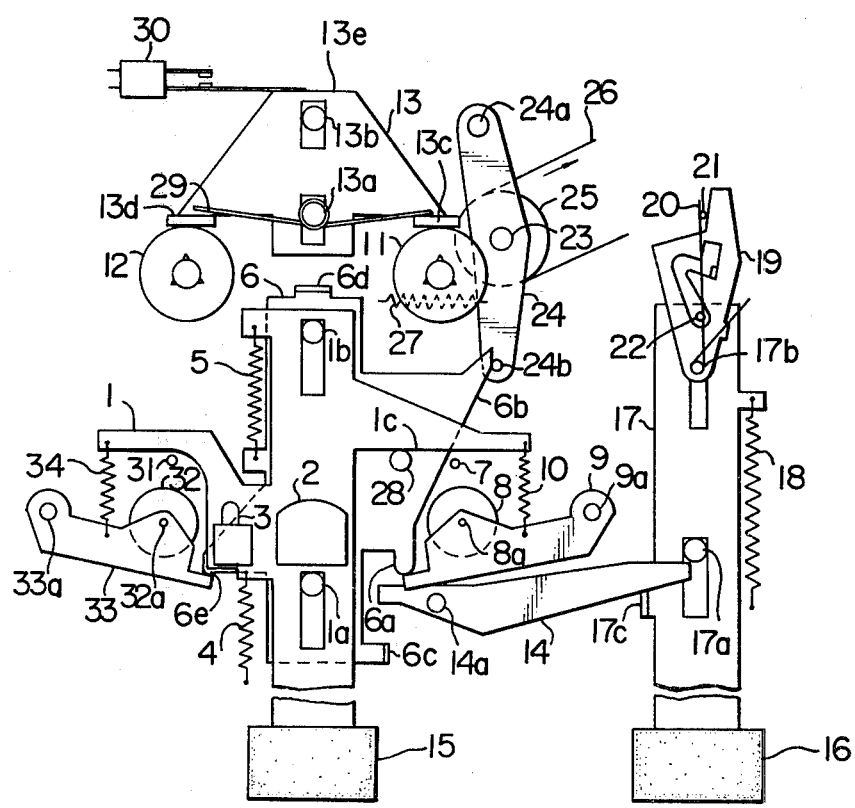
FIG. 4 is a plan view showing the stop state of a second embodiment of the tape recorder according to the present invention.

The diagram of FIG. 4 shows another embodiment of what is called "dual capstan" type having two pairs of capstans and pinch rollers. Another capstan 31 is arranged symmetrically with the capstan 7. The capstan 31 is opposed to a pinch roller arm 33 for rotatably supporting the pinch roller 32 on the shaft 32a, and is rotatably supported on the shaft 33a of the fixed base. The spring 34 is tensioned between the arm 33 and the head base plate 1, and the control board 6 is further provided with a protrusion 6e. The operation of this dual capstan type tape recorder is identical to that of the preceding embodiment and will not be explained again.

It will be understood from the foregoing description that according to the present invention, the movement of the magnetic heads between the playback and stop positions, the movement of the pinch roller toward and away from the capstan, the movement of the take-up roller toward and away from the take-up reel mount and the movement of the brake plate toward and away from the pair of reel mounts are performed by a single control board associated with the head base plate. Therefore, the relative timings of the respective movements are determined by the shape of the control board, thereby improving the timing accuracy greatly as compared with the conventional methods in which respective controls are performed by individual parts. Further, the simplicity of the construction of the tape recorder according to the invention makes it suitable for mass production.

Also, in view of the fact that the braking system operates at the time of pause as in the stop condition, the tape positively makes a pause without any slack thereof which otherwise might occur due to inertia, thus stabilizing the restarting of tape feed after the cancellation of the pause. Furthermore, the tape recorder according to the invention may be so constructed that by associating the brake mechanism with the automatic stop mechanism, it is possible to make such an arrangement that in the pause state when the brake otherwise might work and therefore the automatic stop mechanism might fail to operate, a fast forward or rewind operations cause the brake mechanism to be released, thus making the automatic stop mechanism operable even during the pause state. In this way, the case of the automatic stop mechanism inconveniently failing to operate when the pause button is depressed simultaneously with the fast forward or rewind button is eliminated.

We claim:

1. In a tape recorder of the type having a head base plate carrying at least one magnetic head mounted upon said head base plate and movable between a playback position and a stop position, said head base plate being urged toward the stop position by a first elastic member, a capstan for feeding the tape at fixed speed, a pinch roller arm rotatably supporting a pinch roller opposed to said capstan, a pair of reel mounts for taking up and supplying the tape respectively, a take-up arm rotatably supporting a take-up roller, and a brake plate for applying the braking force to said pair of reel mounts; the improvement comprising: a control board which is biased toward said playback position by a second elastic member connected between said control board and said head base plate, and which has a stopping member for defining a relative position of said control board with respect to said head base plate against said second elastic member, said control board and said head base plate being movable in a state maintaining said relative position when said control board moves toward said playback position, the control board itself being movable independently of said head base plate toward said stop position in opposition to the biasing of said second elastic member by an external operation after said control board has been located at said playback position, and said control board being a single member including a first control section coacting with said pinch roller arm to move said pinch roller arm toward and away from said capstan, a second control section coacting with said take-up arm to move said take-up arm toward and away from said take-up reel mount, and a third control section coacting with said brake plate to move said brake plate toward and away from said reel mounts.

2. A tape recorder according to claim 1, further comprising a pause operating member, and a pause member movable by said pause operating member for moving said control board toward said stop position against said second elastic member, a pause state, at which said pinch roller is disengaged from said capstan, said take-up reel is disengaged from said take-up reel mount, and said brake plate is engaged with said pair of reel mounts, being obtained by the movement of said control board toward said stop position, and said control board being returned to said playback position defined by said stopping member by means of said second elastic member when said pause operating member is released.

* * * * *